United States Patent [19]

Miller et al.

[11] Patent Number: 5,468,598
[45] Date of Patent: Nov. 21, 1995

[54] SOLID PARTICLE DISPERSIONS FOR IMAGING SYSTEMS

[75] Inventors: David D. Miller; Mary C. Brick, both of Rochester; Mridula Nair, Penfield, all of N.Y.

[73] Assignee: Eastman Kodak Company, Rochester, N.Y.

[21] Appl. No.: 228,839

[22] Filed: Apr. 18, 1994

[51] Int. Cl.⁶ ............................................ G03C 11/00
[52] U.S. Cl. .................. 430/372; 430/137; 430/495; 430/510; 430/517; 430/513; 430/627; 430/607; 430/531; 241/16
[58] Field of Search .................... 430/372, 137, 430/495, 510, 517, 513, 627, 607, 531; 241/16

[56] References Cited

U.S. PATENT DOCUMENTS

| | | | |
|---|---|---|---|
| 2,378,283 | 6/1945 | Bucher | 241/22 |
| 2,844,486 | 7/1958 | Lamar | 106/308 |
| 3,030,370 | 4/1962 | Jackson | 260/279 |
| 3,593,927 | 7/1971 | Neill | 241/16 |
| 3,912,517 | 10/1971 | Van Poucke et al. | 241/16 |
| 3,947,287 | 3/1976 | Belde et al. | 96/100 |
| 3,966,655 | 6/1976 | Kovacs et al. | 260/29.2 |
| 4,006,025 | 2/1977 | Swank et al. | 420/580 |
| 4,245,993 | 1/1981 | Kirner et al. | 8/664 |
| 4,294,916 | 10/1981 | Postle et al. | 430/522 |
| 4,294,917 | 10/1981 | Postle et al. | 430/522 |
| 4,326,982 | 4/1983 | Neumann et al. | 260/308 |
| 4,369,040 | 1/1983 | Kirner et al. | 8/527 |
| 4,371,643 | 2/1983 | Thomas | 524/88 |
| 4,427,810 | 1/1984 | Chisvette et al. | 524/8 |
| 4,522,654 | 6/1985 | Chisvette et al. | 106/288 |
| 4,523,923 | 6/1985 | Buchel et al. | 8/524 |
| 4,665,107 | 5/1987 | Micale | 523/105 |
| 4,725,314 | 2/1988 | Gulla et al. | 106/1.11 |
| 4,740,370 | 4/1988 | Faryniarz et al. | 424/61 |
| 4,900,653 | 2/1990 | Factor et al. | 430/522 |
| 4,940,654 | 6/1990 | Diehl et al. | 430/522 |
| 5,074,887 | 12/1991 | Koci et al. | 8/527 |
| 5,087,649 | 2/1992 | Wegner et al. | 524/30 |
| 5,145,684 | 9/1992 | Liversedge et al. | 424/489 |
| 5,278,037 | 1/1994 | Karino et al. | 430/513 |
| 5,300,394 | 4/1994 | Miller et al. | 430/137 |

FOREIGN PATENT DOCUMENTS

| | | |
|---|---|---|
| A-28293/92 | 11/1992 | Australia . |
| 0567214 | 3/1993 | European Pat. Off. . |
| 2745893 | 10/1976 | Germany . |
| 55/151544 | 11/1980 | Japan . |
| 61/172810 | 8/1986 | Japan . |
| 63/112519 | 5/1988 | Japan . |
| 3/131355 | 10/1989 | Japan . |
| 4/289856 | 10/1992 | Japan . |
| 1551829 | 9/1979 | United Kingdom . |
| 1570362 | 7/1980 | United Kingdom . |

OTHER PUBLICATIONS

Research Disclosure, Dec. 1989, Item 308119, Sections VII & VIII.

Primary Examiner—Thomas R. Neville
Attorney, Agent, or Firm—Andrew J. Anderson

[57] ABSTRACT

A process for preparing a stable, solid particle dispersion of a substantially water-insoluble compound useful in imaging, comprises the steps of:

(a) forming a coarse aqueous slurry of solid particles of said compound and a hydrophobic, water-soluble or water-dispersible polymer in an amount of 0.1 to 100% by weight based on the weight of said compound; and (b) milling said slurry for time sufficient to provide particles of the desired average particle size;

wherein the polymer is an uncharged or weakly anionically charged water-soluble or water-dispersible homopolymer or copolymer in which at least 10 mole % of the repeat units contain an uncharged pendant group that terminates in (a) a $CH_3$ unit, (b) a ring containing at least two contiguous $CH_2$ units, or (c) an aromatic group.

The resulting dispersion has dispersed solid particles of said compound having the desired small particle size and is stable toward particle agglomeration, particle growth and needle growth.

15 Claims, No Drawings

SOLID PARTICLE DISPERSIONS FOR IMAGING SYSTEMS

FIELD OF THE INVENTION

This invention relates to imaging technology, such as photography and thermal imaging, and in particular, to a method for stabilizing solid particle dispersions of substantially water insoluble compounds useful in imaging.

BACKGROUND OF THE INVENTION

Substantially water-insoluble compounds useful in imaging are generally incorporated into imaging materials as dispersions or emulsions. Such compounds include inter alia filter dyes used to prevent transmission of unwanted light from one layer in a photographic element to another and thermal transfer dyes used to create dye images in a thermal dye transfer process.

In many cases, the water-insoluble compound useful in imaging is dissolved in one or more organic solvents, and the resulting oily liquid is then dispersed into an aqueous solution containing, optionally, emulsifiers or dispersing aids such as surfactants and/or hydrophilic colloids such as gelatin. Dispersal of the oily liquid into the aqueous medium is accomplished using high shearing rates or high turbulence in devices such as colloid mills, homogenizers, or ultrasonicators.

In the art of dispersion making, the use of organic solvents has traditionally been considered necessary to achieve small particle sizes, to achieve stable dispersions, and to achieve the desired reactivity or function of the compound useful in imaging. Many compounds useful in imaging cannot be dispersed in the above manner, however, because of their poor solubility in most organic solvents. Others may have sufficient solubility in organic solvents, but it may be desirable to eliminate the use of the organic solvent to, for example, reduce coated layer thickness, to reduce undesirable interactions of the organic solvent with other materials in the imaging element, to reduce risk of fire or operator exposure in manufacturing, to obtain the desired light absorption characteristics, or to improve the sharpness of the resulting image, which is adversely affected by the presence of the organic solvent.

In view of these disadvantages, it has been proposed in the art to use solid particle dispersions in photography, for example, solid particle filter dye dispersions, in U.S. Pat. No. 4,294,916 to Postle et al, solid particle filter dye dispersions U.S. Pat. No. 4,294,917 to Postle et al, and U.S. Pat. No. 4,940,654 to Diehl and Factor. Techniques for making solid particle dispersions are very different from the techniques used to make dispersions of oily liquids as described above. Typically, solid particle dispersions are made by mixing the crystalline solid of interest with an aqueous solution that may contain one or more grinding aids or stabilizers. Particle size reduction is accomplished by subjecting the solid crystals in the slurry to repeated collisions with hard, inorganic milling media, such as sand, spheres of silica, stainless steel, silicon carbide, glass, zirconium, zirconium oxide, yttria-stabilized zirconium oxide, alumina, titanium etc., all of which fracture the crystals. The bead sizes typically range from 0.25 to 3.0 millimeters (mm) in diameter. Ball mills, media mills, attritor mills, jet mills, vibratory mills, etc. are frequently used to accomplish particle size reduction.

Unfortunately, both the size reduction of crystalline compounds useful in imaging and the stabilization of the resulting dispersions are much more difficult than the emulsification of liquids or the stabilization of conventional liquid droplet dispersions. Traditional dispersants or stabilizers such as anionic or nonionic alkyl or aryl surfactants, as disclosed in the above-noted U.S. Pat. Nos. 4,294,916, 4,294,917 and 4,940,654, tend to adsorb much more readily to liquid surfaces than to the surfaces of solid particle surfaces and the use of such traditional dispersants or stabilizers as grinding aids in the making of solid particle dispersions frequently results in extraordinarily long milling times to achieve a given particle size reduction. Furthermore, traditional stabilizers tend to promote unwanted crystal and/or needle growth. Such particle growth is undesirable since it reduces the covering power of the compound useful in imaging in the coated layers of an imaging element, while the presence of needle-like crystals results in filter plugging and poor manufacturability. Filter dyes are particularly susceptible to needle growth when mixed, prior to coating, with conventional dispersions containing organic solvents.

Solid particle dispersions of photographically useful materials have been disclosed in UK Patent No. 1,570,362 to Langen et. al. and U.S. Pat. No. 4,006,025 to Swank. In U.K. Patent No. 1,570,362, monomeric, oligomeric, and polymeric alkylaryl sulfonates are disclosed as dispersing agents for solid spectral sensitizing dye and coupler dispersions. In U.S. Pat. No. 4,006,025, very low levels of poly(vinyl pyrrolidone) are disclosed to be useful as grinding aids in the production of solid particle dispersions of anionic, cationic, or zwitterionic cyanine spectral sensitizing dyes, and it is further disclosed that poly(vinyl pyrrolidone) can be added to the resulting dispersions after milling as an antiflocculant. We have found that the procedures described in Langen and Swank result in dispersions having unacceptably large particle size or are unstable, especially to undesired particle growth.

PROBLEM TO BE SOLVED BY THE INVENTION

This invention addresses the problem of preparing solid particle dispersions of compounds useful in imaging which have the desired particle size and which are resistant to particle growth, such as particle agglomeration, crystal growth and/or needle growth. Further, this invention addresses the problem of producing the desired fine particle size within relatively short milling times.

SUMMARY OF THE INVENTION

It is the object of the present invention to provide a grinding aid and stabilizer for solid particle dispersions of compounds useful in imaging that provides superior particle size reduction while preventing particle agglomeration, particle growth and needle growth. It has been found that the use of certain water-soluble polymers as grinding aids and stabilizers provides excellent particle size reduction, and reduced tendency for crystal growth, needle growth, and particle agglomeration.

One aspect of this invention comprises a process for preparing a stable, solid particle dispersion of a substantially water-insoluble compound useful in imaging, comprising the steps of:

(a) forming a coarse aqueous slurry of solid particles of said compound and a hydrophobic, water-soluble or water-dispersible polymer in an amount of 0.1 to 100% by weight, based on the weight of said compound; and (b) milling said slurry for time sufficient to provide particles of the desired average particle size;

wherein the polymer is an uncharged or weakly anionically charged water-soluble or water-dispersible homopolymer or copolymer in which at least 10 mole % of the repeat units contain an uncharged pendant group that terminates in (a) a $CH_3$ unit, (b) a ring containing at least two contiguous $CH_2$ units, or (c) an aromatic group.

By weakly anionically charged we mean that no repeating unit that makes up more than 10 mole % of the copolymer has a pKa of less than about 3 (in its monomer form). By copolymer we mean that the polymer contains more than one type of repeating unit.

ADVANTAGEOUS EFFECT OF THE INVENTION

With our invention, dispersions of compounds useful in imaging can be made more quickly, and/or with a finer particle size, and with vastly improved stability to particle agglomeration, crystal growth and/or needle growth.

DETAILED DESCRIPTION OF THE INVENTION

In accordance with this invention, hydrophobic, water-soluble or water-dispersible polymers are used as grinding aids and/or stabilizers in the preparation of solid particle dispersions of compounds useful in imaging. Preferred hydrophobic, water-soluble or water-dispersible polymers have molecular weights of about 20,000 to 10 million. The polymer is an uncharged or weakly anionically charged homopolymer or copolymer in which at least 10 mole % of the repeat units contain an uncharged, pendant group that terminates in (a) a $CH_3$ unit, (b) a ring containing at least two contiguous $CH_2$ units or (c) an aromatic group.

By weakly anionically charged we mean that no repeating unit that makes up more than 10 mole % of the copolymer has a pKa of less than about 3 (in its monomer form). By copolymer we mean that the polymer contains more than one type of repeating unit.

By hydrophobic, water-soluble or water-dispersible polymer, we mean that the polymer is water-soluble or dispersible yet contains a substantial hydrophobic portion. By copolymer, we mean that the polymer contains more than one type of repeating unit. Examples of preferred uncharged repeating units are those derived from vinyl acetate, vinyl pyrrolidone, methyl, ethyl or propyl amides of ethyleneimine, vinyl methyl ether, vinyl methyl oxazolidone, methyl acrylate, methyl methacrylate, butyl acrylate, butyl acrylamide, styrene, ethyl acrylamide, propyl acrylamide, valine, leucine, isoleucine, etc. Examples of preferred weakly charged repeating units are those derived from acrylic acid, glutamic acid, methacrylic acid, aspartic acid, maleic acid, maleic anyhdride, etc.

Specific examples of such hydrophobic, water-soluble or water-dispersible polymers which can be utilized in the process of the present invention are given below. It is to be understood that this list is representative only, and is not meant to be exclusive.

P-1: partially hydrolyzed poly(vinyl acetate) [88% vinyl alcohol, 12% vinyl acetate].

P-2: poly(ethyloxazoline).

P-3: poly(vinyl pyrrolidone).

P-4: copolymers of methyl acrylate and acrylamide.

P-5: copolymers of vinyl pyrrolidone and vinyl acetate.

P-6: copolymers of vinyl pyrrolidone and acrylic acid.

P-7: copolymer of vinyl pyrrolidone and acrylic acid where the ratio of vinyl pyrrolidone to acrylic acid is 75:25.

P-8: copolymers of t-butyl acrylamide and acrylamide.

P-9: copolymers of methyl methacrylate and acrylamide.

P-10: copolymers of vinyl pyrrolidone and vinyl acetate where the ratio of vinyl pyrrolidone to vinyl acetate is 60:40.

P-11: poly(N,N-dimethyl acrylamide).

P-12: poly(vinyl methyl oxazolidone).

P-13: poly(vinyl methyl ether).

P-14: Poly(ethylene oxide) grafted onto a copolymer of maleic anhydride and dodecene The stabilized dispersion of this invention can be prepared by mixing together a water-soluble or water-dispersible polymer as described above and a coarse aqueous slurry of the compound useful in imaging. By coarse aqueous slurry, we mean an aqueous slurry of particles of the compound useful in imaging, having a particle size of about 2 to about 5000 microns, preferably 2 to about 1000 and more preferably 2 to about 600 μm. The resulting mixture is then loaded into a mill. Optionally, additional non-polymeric stabilizers such as anionic and cationic surfactants can be added to the polymer-slurry mixture. The amount of water-soluble or water-dispersible polymer used can vary over a wide range, but is generally in the range of 0.01% to about 100%, preferably about 0.3 to about 60%, and more preferably 0.5 to 20%, the percentages being by weight, based on the weight of the compound useful in imaging. The optional additional surfactants can be added at levels varying between about 0.1 and about 100%, preferably, about 0.5 to about 20% of by weight, based on the weight of the compound useful in imaging.

The mill used can be for example a ball mill, media mill, attritor mill, jet mill, vibratory mill, or the like. The mill is charged with any appropriate milling media such as, for example, beads of silica, silicon nitride, sand, zirconium oxide, yttria-stabilized zirconium oxide, alumina, titanium, glass, etc. The bead sizes typically range from 0.25 to 3.0 mm in diameter. The slurry is then added to the mill where repeated collisions of the milling media with the solid crystals result in crystal fracture and consequent particle size reduction. The slurry is milled for a sufficient time to produce particles of the desired particle size. Generally for use in imaging elements, a solid particle dispersion of this invention should have an average particle size of 0.01 to about 10 μm preferably 0.05 to about 5mm and move preferably about 0.05 to about 3 μm. Generally, the desired particle size can be achieved by milling the slurry for 30 minutes to 31 days, preferably 60 minutes to 14 days, depending on the mill used.

Additional surfactants or other water-soluble or water-dispersible polymers can be added after milling, but before subsequent addition of the small particle dispersions to an aqueous imaging coating medium, as described below. Such surfactants include for example the following:

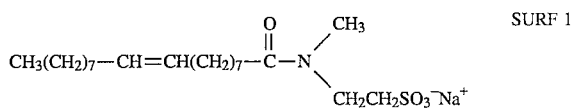

SURF 1 a mixture of:

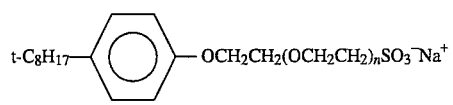 SURF 2

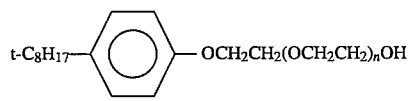

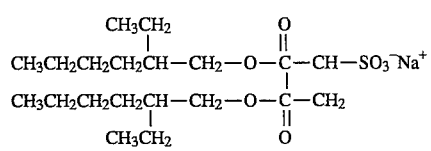 SURF 3

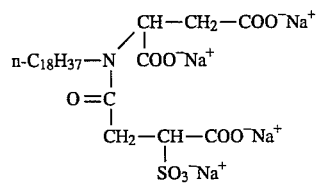 SURF 4

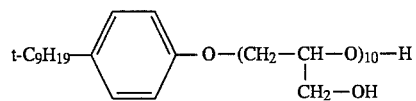

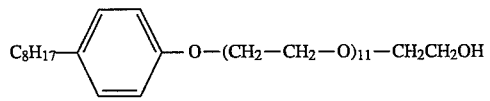 SURF 6

SURF 7

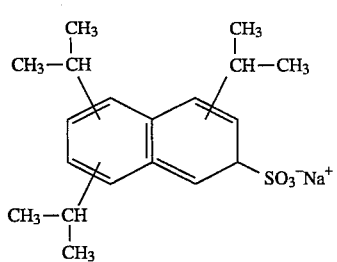 SURF 8

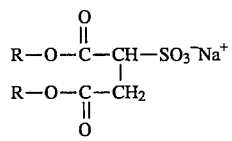 SURF 9 where R = CH(CH$_3$)C$_4$H$_9$ SURF 10 where R = —CH$_2$—CH$_2$— 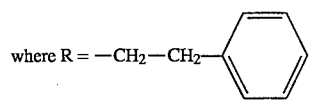 SURF 11 where R = —CH$_2$—CH—CH$_3$ 

where R = —CH$_2$—CH(CH$_2$CH$_3$)C$_3$H$_7$ SURF 12 where R = —(CH$_2$)$_n$CH$_3$ (n = 2, 3 & 5) SURF 13

-continued

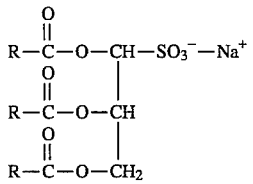 SURF 14 where R = —(CH$_2$)$_n$— 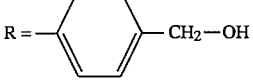 (n = 2–5)

n-C$_{12}$H$_{25}$—O—(CH$_2$—CH$_2$—O)$_{22}$—CH$_2$CH$_2$OH  SURF 15

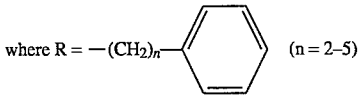 SURF 16

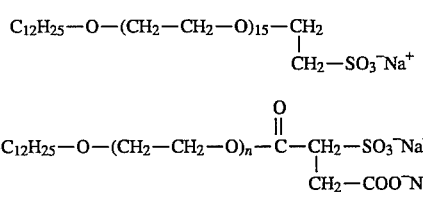 SURF 17 n = 3–5

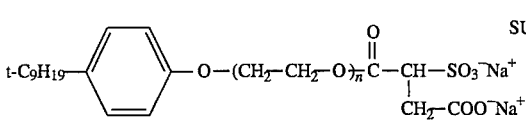 SURF 18 n = 5–10

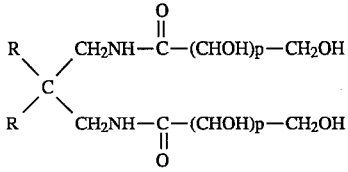 SURF 19 where p = 3 to 10 where, R = n-CH$_3$—(CH$_2$)$_x$— (where x = 3–10) SURF 20 where R = 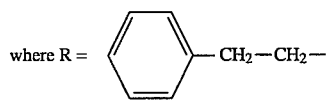 SURF 21

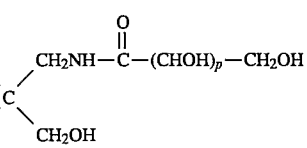 SURF 22 where, R = n-CH$_3$—(CH$_2$)$_x$— (where x = 3 to 10
p = 3 to 15)

R = 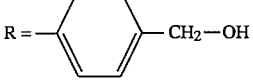

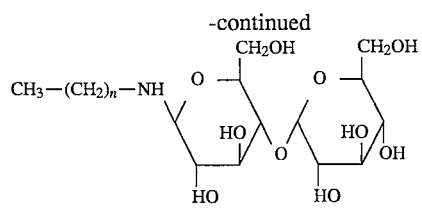 SURF 23 where, n = 3 to 15

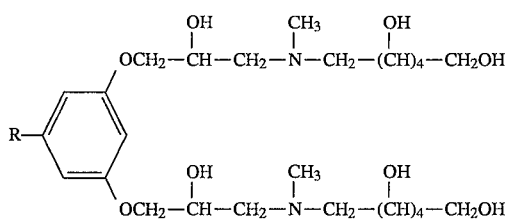 SURF 24 where R = CH$_3$—(CH$_2$)$_x$—
(where, x = 1 to 5)

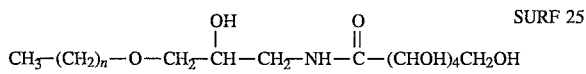 SURF 25 where n = 3 to 15

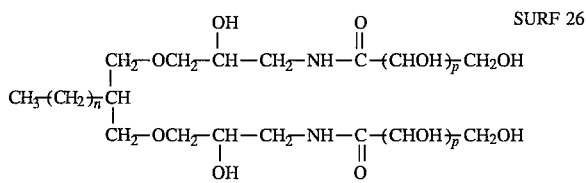 SURF 26 where, n = 2 to 12
p = 3 to 10

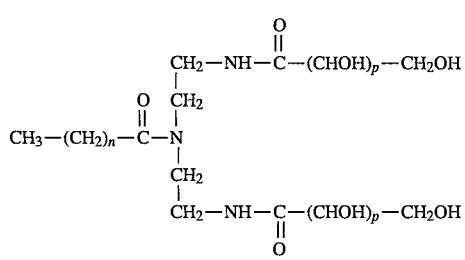 SURF 27 where, n = 2 to 18
p = 3 to 10

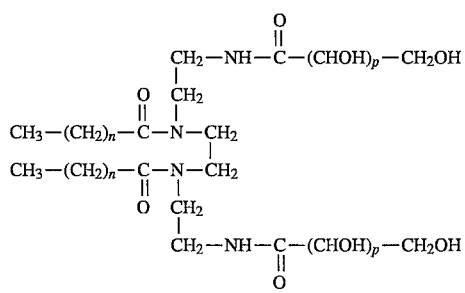 SURF 28 where, n = 2 to 18
p = 3 to 10

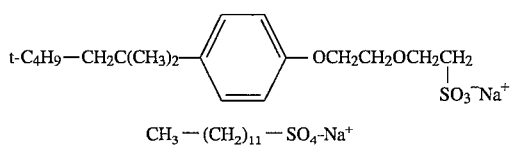 SURF 29

CH$_3$—(CH$_2$)$_{11}$—SO$_4$-Na$^+$  SURF 30

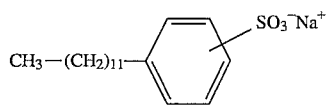 SURF 31

The resulting dispersion of the compound useful in imaging containing the water-soluble, hydrophobic polymer useful in this invention can then be added to an aqueous medium, if desired, for coating onto a imaging support. The aqueous medium preferably contains other compounds such as stabilizers and dispersants, for example, additional anionic, nonionic, zwitterionic, or cationic surfactants, and water-soluble binders such as gelatin.

The dispersion this invention can be used in the preparation of an imaging element comprising a support, such as paper or film, having coated thereon at least one light sensitive layer. The dispersion can be coated as a component of non-imaging layer, such as an interlayer. In other embodiments, the dispersion is mixed with imaging components, such as a silver halide emulsion, and coated as an imaging layer onto the support. In some embodiments of this invention, the dispersion can be mixed with another aqueous dispersion of a photographically useful compound dissolved in an organic solvent and dispersed as oily droplets. Such photographically useful confounds include couplers, UV absorbing dyes, oxidized developer scavengers, and the like. If desired, the dispersion of this invention can be stored either separately or as a mixture with other components until needed. The preparation of single and multilayer imaging elements is described in Research Disclosure 308119 dated December 1989, the disclosure of which is incorporated herein by reference.

The compound useful in imaging dispersed in accordance with this invention can be, for example, a coupler, filter dye, thermal transfer dye, UV absorbing dye, oxidized developer scavenger, and the like. Examples of such compounds can be found in Research Disclosure, December 1989, Item 308, 119 published by Kenneth Mason Publications, Ltd., Dudley Annex, 12a North Street, Emsworth, Hampshire P010 7DQ, England, Sections VII and VIII, which are incorporated herein by reference. In particularly preferred embodiments of the invention, the compound useful in imaging is a filter dye or a thermal transfer dye.

The solid particle filter dye dispersions of this invention are used in coated layers of photographic elements to absorb light from different regions of the spectrum, such as red, green, blue, ultraviolet, and infrared light. The filter dyes are often required to perform the function of absorbing light during the exposure of the photographic element so as to prevent or at least inhibit light of a certain region of the spectrum from reaching at least one of the radiation sensitive layers of the element. The solid particle filter dye dispersion is typically coated in an interlayer between dye-forming layers, or in an antihalation layer directly above the support of the element. Typical photographic elements (and materials, supports, etc. useful in the preparation thereof) in which the solid particle filter dye dispersions of this invention can be incorporated are disclosed in above-noted Research Disclosure 308,119, incorporated herein by reference. Filter dyes are usually solubilized and removed or at least decolorized during photographic processing. Details of such materials are given in U.S. Pat. No. 4,900,653 to Factor and Diehl, the entire disclosures of which are incorporated herein by reference.

The thermal transfer dyes useful in this invention are used in coated layers of thermal transfer imaging elements in donor materials, and provide a source of thermally mobile image dye that transfers imagewise onto an appropriate receiver material.

The support of image forming elements of this invention can be coated with a magnetic recording layer as discussed in Research Disclosure 34390 of November 1992, the disclosure of which is incorporated herein by reference.

Illustrative filter dyes and thermal transfer dyes that can be used in accordance with this invention are given below. It is to be understood that the dyes may be employed singly or in combination and that this list is representative only and is not meant to be exclusive.

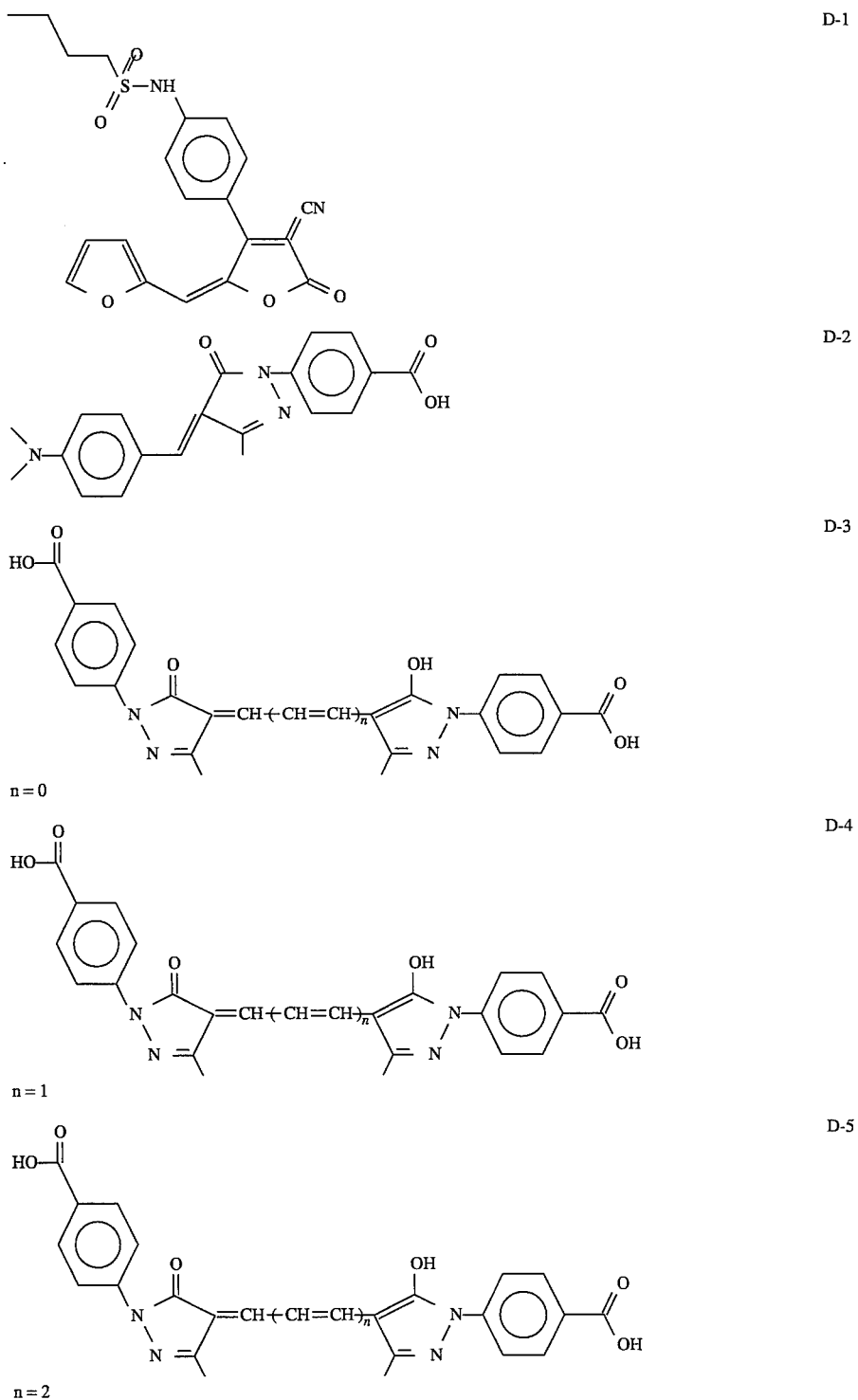

-continued
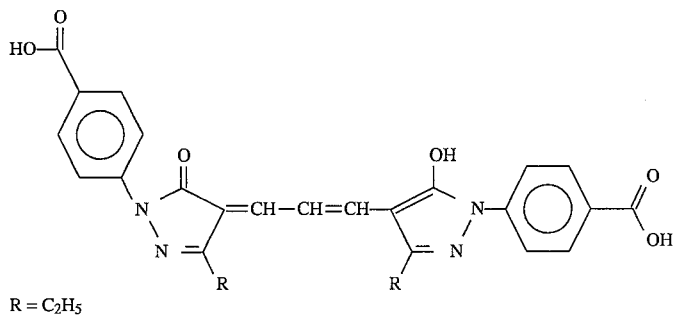
R = C₂H₅
D-6
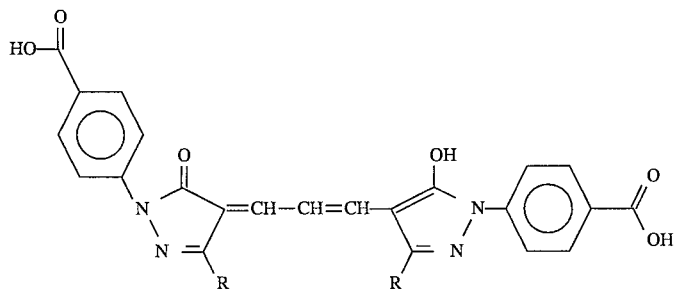
R = C₃H₇
D-7
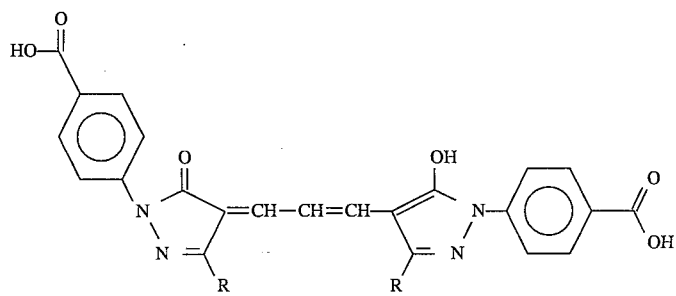
R = C₄H₉
D-8
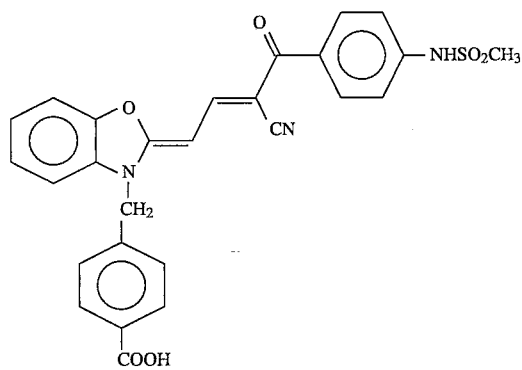
D-9
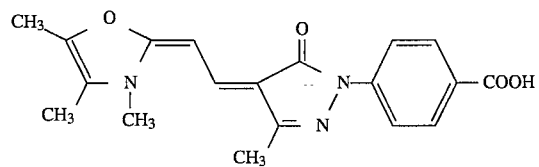
D-10

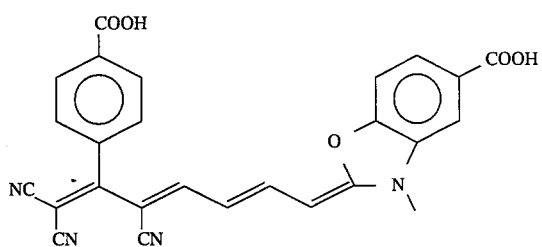
D-11
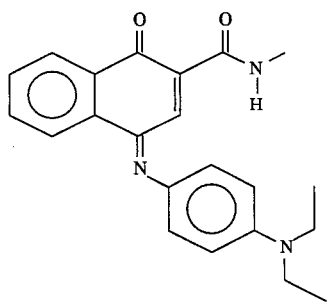
D-12
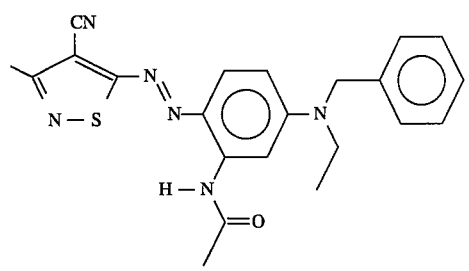
D-13
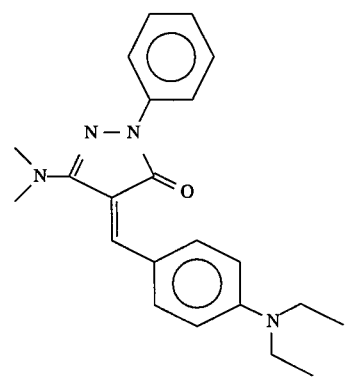
D-14
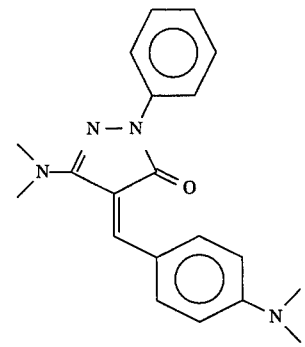
D-15

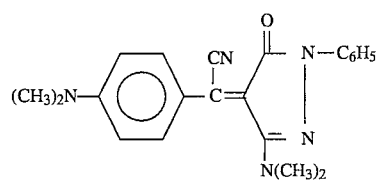
D-16
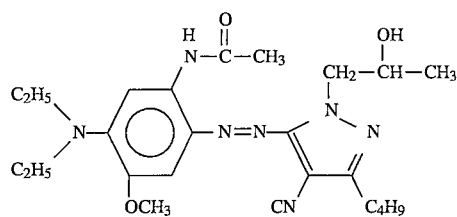
D-17
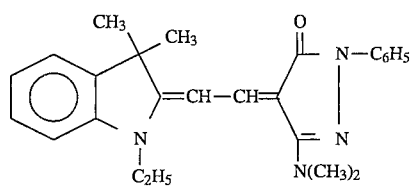
D-18
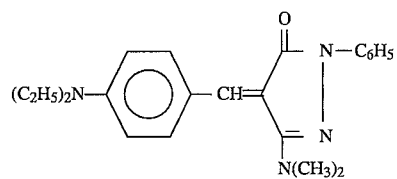
D-19
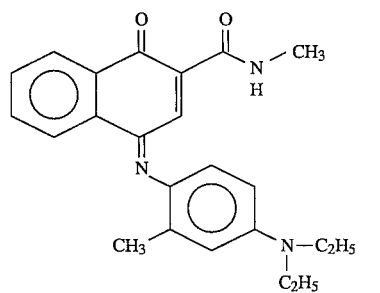
D-20
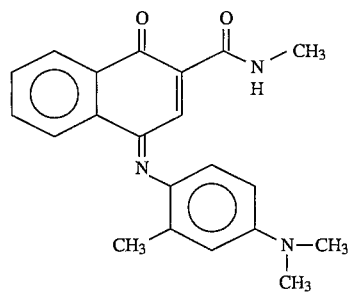
D-21
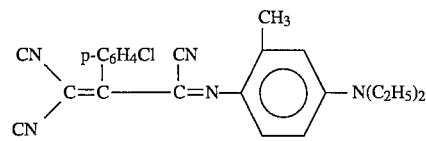
D-22

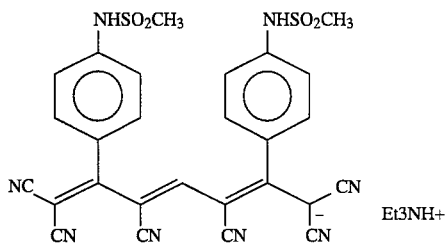 D-23

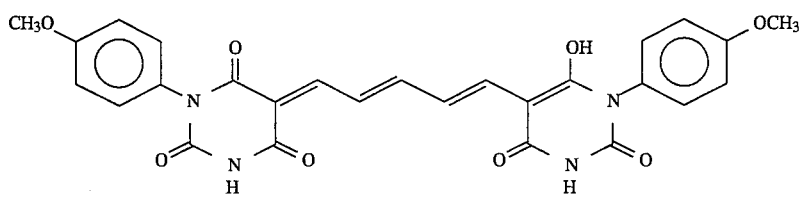 D-24

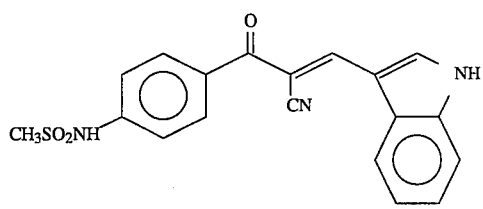 D-25

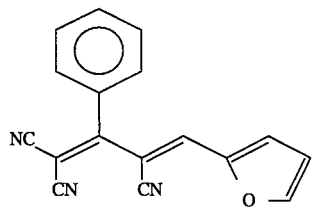 D-26

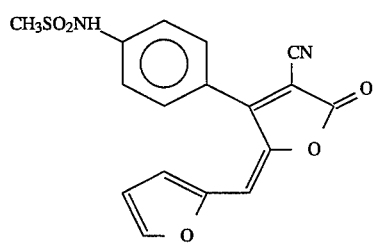 D-27

Other filter dyes that can be used in accordance with the invention include dyes disclosed in, U.S. Pat. Nos. 4,803,150; 4,855,221; 4,857,446; 4,900,652; 4,900,653; 4,940,654; 4,948,717; 4,948,718; 4,950,586; 4,988,611; 4,994,356; 5,098,820; 5,213,956; 5,260,179; 5,266,454; and EP 430,180. The disclosures of each of these patents is incorporated herein by reference.

Other thermal transfer dyes that can be used in accordance with this invention include anthraquinone dyes, e.g., Sumikaron Violet RS® (product of Sumitomo Chemical Co., Ltd.), Dianix Fast Violet 3R-FS® (product of Mitsubishi Chemical Industries, Ltd.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumikaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Industries, Ltd.) and Direct Brown M® and Direct Fast Black D® (products of Nippon Kayaku Co. Ltd.); acid dyes such as Kayanol Milling Cyanine 5R® (product of Nippon Kayaku Co. Ltd.); basic dyes such as Sumiacryl Blue 6G® (product of Sumitomo Chemical Co., Ltd.), and Aizen Malachite Green® (product of Hodogaya Chemical Co., Ltd.); or any of the dyes disclosed in U.S. Pat. Nos. 4,541,830, 4,698,651, 4,695,287, 4,701,439, 4,757,046, 4,743,582, 4,769,360, and 4,753,922, the disclosures of which are hereby incorporated by reference.

The following examples illustrate the preparation and use of stabilized solid particle dispersions in accordance with this invention.

Example 1

A dispersion of a thermal transfer dye was made by placing 10.0 g of thermal transfer dye D-12 in an 8 oz glass jar containing 25.0 g distilled water, 15.0 g of a 10 wt % aqueous solution of P-3 (MW of 38,000) and 125 ml of 1.8 mm zirconium oxide beads. The jar was placed on a Sweco vibratory mill for 6 days. A comparative dispersion was made in the same manner, except that the dispersant Tetronic 908 was substituted on a equal-weight basis for P-3. After milling, the dispersions were held at 45° C. for 24 hours. After this period, the particle size of each dispersion was measured by near infrared turbidimetry. Table I give the mean particle size results in microns of the dispersion of compound D-12 before and after the holding period.

TABLE I

| Dispersant | Mean Particle Size, microns t = 0 | Mean Particle Size, microns t = 24 hrs at 45° C. |
|---|---|---|
| Tetronic 908 (comparative) | 0.219 | 0.255 |
| P-3 (invention) | 0.165 | 0.164 |

Results from Table I show that the dispersion of compound D-12 with P-3 is not only finer initially, but also exhibits no particle growth compared to the dispersion made with Tetronic 908.

Example 2

A dispersion of a thermal transfer dye was made by placing 10.0 g of dye D-14 in an 8 oz glass jar containing 25.0 g distilled water, 15.0 g of a 10 wt % aqueous solution of P-3 (MW of 38,000) and 125 ml of 1.8 mm zirconium oxide beads. The jar was placed on a Sweco vibratory mill for 6 days. A control dispersion was made in the same manner, except that the dispersant Tetronic 908 was substituted on a equal-weight basis for P-3. After milling, the dispersions were held at 45° C. for 24 hours. After this period, the particle size of each dispersion was measured by near infrared turbidimetry. Table II gives the mean particle size results in microns of the dispersion of compound D-14 before and after the holding period.

TABLE II

| Dispersant | Mean Particle Size, microns t = 0 | Mean Particle Size, microns t = 24 hrs at 45° C. |
|---|---|---|
| Tetronic 908 (comparative) | 0.187 | 0.348 |
| P-3 (invention) | 0.109 | 0.129 |

Results from Table II show that the dispersion of compound D-14 with polyvinyl pyrrolidone is not only finer initially, but also exhibits significantly less particle growth compared to the dispersion made with Tetronic 908.

Example 3

A dispersion of a yellow filter dye was made by placing 40.0 g of D-1 in a 32 oz jar containing 96 g of water, 64 g of a 2.5% solution of P-3, and 500 ml of 1.8 mm zirconium oxide beads. The pH was adjusted to 3.5 with dilute sulfuric acid, and the jar was placed on a roller mill for 10 days. This dispersion will be referred to as S-1. Dispersion S-2 was made similarly, but with 64 g of a 2.5% solution of P-7. Dispersion S-3 was made similarly, but with 13 g of a 12.3% solution of P10 and 147 g of water, Dispersion S-4 was made similarly, but with 16 g of a 10% solution of P-2 and 144 g of water. Dispersion S-5 was made similarly, but with 36 g of water, 64 g of a 2.5% solution of P-3 and 60 g of a 6.67% solution of the anionic surfactant, SURF-2 (Triton X-200 from Roban and Haas Co.). Dispersion S-6 was made similarly but with 96.8 g of water, 3.2 g of a 50% solution of P-13 in water, and 60 g of a 6.67% solution of the anionic surfactant SURF-2. A check dispersion representing the prior art was made similarly, but with 100 g of water and 60 g of a 6.67% solution of SURF-2. This dispersion is referred to as S-7. Several dispersions were also made using water-soluble or water-dispersible polymers that fall outside the scope of our invention. Thus, dispersion S-8 was made similarly to S-1, but with 144 g of water and 16 g of a 10% solution of poly(ethyleneimine) (X-1). S-9 was made using 106.6 g of water and 53.3 g of a 3% solution of poly(vinyl alcohol) (X-2) in water, S-10 was made using 106.7 g of water and 53.3 g of a 3% solution of poly(ethylene oxide) (X-3) in water, and S-11 was made using 144.8 g of water and 15.2 g of a 10.5% solution of a terpolymer of a) t-butyl acrylamide, b) acrylamide and c) 1-propanesulfonic acid, 2-methyl-2[(1-oxo-2-propenyl)amino]-,monosodium salt in the mole ratio of 50:25:25 (X-4). Additional dispersions were made using polymers X-1 through X-3 in the same amounts as described above, in conjunction with SURF-2 (60 g of a 6.67% solution in each case). These dispersions are referred to as S-12 through S-14, respectively. After milling, the particle size of each dispersion was measured by near infrared turbidimetry. Table III gives the mean particle size results in microns for each dispersion of dye D-1.

TABLE III

| | Dispersant | Mean Particle Size, microns | Amount Filtered in 30 Seconds | Needles after incubation? |
|---|---|---|---|---|
| S-1 | P-3 | 0.1068 | 50 g | No |
| S-2 | P-7 | 0.0986 | | No |
| S-3 | P-10 | 0.1068 | | No |
| S-4 | P-2 | 0.1116 | | No |
| S-5 | P-3 + SURF-2 | 0.1058 | 65 g | No |
| S-6 | P-13 | 0.1151 | | No |
| S-7 | SURF-2 (comparative) | 0.1302 | 22 g | Yes |
| S-8 | X-1 | agglomerates | | |
| S-9 | X-2 | agglomerates | | |
| S-10 | X-3 | agglomerates | | |
| S-11 | X-4 | agglomerates | | |
| S-12 | X-1 + SURF-2 | agglomerates | | |
| S-13 | X-2 + SURF-2 | agglomerates | | |
| S-14 | X-3 + SURF-2 | agglomerates | | |

Results from Table III clearly indicate that dispersions made according to this invention were finer in particle size than the comparative dispersion made without the water-soluble or water-dispersible polymeric stabilizers. The dispersions made with polymers lying outside the scope of this invention were unstable to agglomeration.

Some of these dispersions were then held at 60° C. for two days, and observed by optical, polarized-light microscopy. Microscopic examination of these incubated dispersions revealed that the comparative dispersion contained many needle-like crystals, while the dispersions made according to our invention were almost free of needle-like crystals. Three of the dispersions that had been incubated at 60° C. for two days (S-1, S-5, and S-7 [comparative]) were then diluted with a 6.67% aqueous gelatin solution to achieve a final concentration of 5% D-1 and 5% gelatin. These gelatin/dye dispersions were passed through a 5 micron filter, and the amount of gelatin/dye dispersion passing through the filter after 30 seconds was recorded. The comparative dispersion was significantly less filterable than the dispersions of the present invention.

Example 4

A dispersion (S-15) of a filter dye was made by placing 4.0 g of D-4 in an 8 oz glass jar containing 41.2 g distilled water, 4.8 g of a 10% solution of SURF-1, [sodium oleyl methyl taurine (OMT)], and 125 ml of 1.8 mm zirconium oxide beads. The jar was placed on a Sweco vibratory mill for 4 days. Another dispersion (S-16) was made similarly, but with 39.6 g of distilled water, 4.8 g of a 10% solution of SURF-1 and 1.6 g of a 10% solution of P-3. After milling, the particle size of the dispersions were measured by near infrared turbidimetry. S-15 represents a comparative dispersion, while S-16 represents a dispersion of this invention.

TABLE IV

| | Dispersant | Particle Size, microns |
|---|---|---|
| S-15 (comparative) | SURF-1 | 0.1261 |
| S-16 (this invention) | P-3 + SURF-1 | 0.1099 |

The dispersion made according to this invention has a significantly smaller particle size than the prior art dispersion.

Example 5

A dispersion (S-17) of a filter dye was made by placing 2.0 g of D-5 in an 8 oz glass jar containing 46.0 g distilled water, 2.0 g of a 10% solution of SURF-1, and 125 ml of 1.8 mm zirconium oxide beads. The jar was placed on a Sweco vibratory mill for 4 days. Another dispersion (S-18) was made similarly, but with 45.2 g of distilled water, 2.0 g of a 10% solution of SURF-1 and 0.8 g of a 10% solution of P-3. After milling, the particle size of the dispersions were measured by near infrared turbidimetry. S-15 represents the prior art, while S-16 represents this invention.

TABLE V

| | Dispersant | Particle Size, microns |
|---|---|---|
| S-17 (comparative) | SURF-1 | 0.1248 |
| S-18 (this invention) | P-3 + SURF-1 | 0.1174 |

The dispersion made according to this invention has a significantly smaller particle size than the comparative dispersion.

Example 6

A dispersion (S-19) of filter dye D-1 was made by mixing 900 g of D-1 with 750 g of a 4.8% aqueous solution of P-3 and 1350 g of a 6.67% solution of SURF-2. The pH was adjusted to 4.0 with dilute sulfuric acid. The coarse slurry was then loaded into a horizontal media mill containing 0.4–0.6 mm zirconia silica beads at 75% loading. A comparative dispersion (S-20) was made similarly, except with 750 g of water replacing the P-3 solution. After 4.6 hours of milling, the particle sizes were measured by near infrared turbidimetry. S-19 had a particle size of 0.1008 microns, while S-20 had a particle size of 0.1294 microns. Clearly, the dispersion made according to our invention shows superior particle size reduction.

Example 7

An oxidized developer scavenger dispersion was prepared by dissolving 12.0 g of compound I in 12.0 g of di-n-butylphthalate and 24.0 g of ethyl acetate at 60° C., then combining with an aqueous phase consisting of 16.0 g gelatin, 6.0 g of a 10% solution of SURF-8 (Alkanol XC from Dupont) and 130.0 g distilled water. The mixture was then passed through a colloid mill 5 times followed by evaporation of the ethyl acetate using a rotary evaporator. Water was added to the dispersion to yield a dispersion having 6.0% scavenger and 8.0% gelatin.

Compound I:

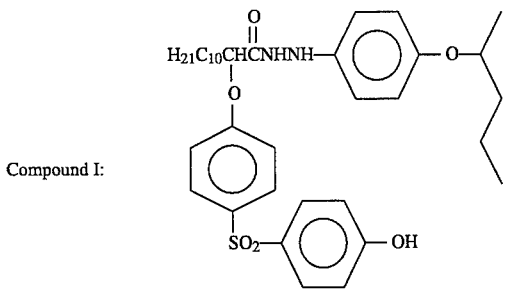

73.82 g of this dispersion were combined with 4.49 g of a 6.67 % solution of SURF-2 and 1.69 g of water and held at 45° C. to make mixture M-1. 30 g of filter dye dispersion S-1 was combined with 24 g of gelatin and 66 g of water, and also held at 45° C. to make mixture M-2. M-1 and M-2 were mixed, held for one hour at 45° C., and then passed through a 5 micron filter. Another 73.82 g of the oxidized developer scavenger dispersion were combined with 4.49 g of a 6.67% solution of SURF-2 and 1.69 g of water and held at 45° C. to make mixture M-3. 30 g of filter dye dispersion S-7 (comparative) were combined with 24 g of gelatin and 66 g of water, and held at 45° C. to make mixture M-4. M-3 and M-4 were mixed, held for one hour at 45° C., and then passed through a 5 micron filter. The amount of material passing through the filters after 10 minutes is given in Table VI:

TABLE VI

| Mixture combination | Amount filtered after 10 minutes |
|---|---|
| M1 + M2 (invention) | 200 g |
| M3 + M4 (comparative) | 40 g |

The mixture containing the dispersion made according to the present invention showed much improved filterability when compared to the mixture prepared according to comparative methods.

Example 8

A dispersion of D-1 (S-22) was made in a small attritor mill using a mixture of 3 g of dye, 4.5 g of a 6.67% solution of SURF-2 and 7.5 g of distilled water. The milling was carried out at 2300 RPM in a 50 ml plastic test tube containing 20 ml of 0.6–0.8 ml SEPR beads (zirconia-silica based ceramic beads) and the slurry was milled for 2 hours. Another dispersion (S-23) of D-1 was made similarly, except with 3 g of a 10% solution of P-14 and 9 g of water. The dispersions were then isolated and the particle size measured by near infrared turbidimetry. The dispersions were incubated at 60° C. for 72 hours and examined microscopically for needle growth. The results are tabulated in Table VII:

TABLE VII

| Dispersions | Dispersant | Particle size, microns | Needles after incubation |
|---|---|---|---|
| S-22 | SURF-2 (comparative) | 0.1959 | Yes |
| S-23 | P-14 (invention) | 0.2054 | Very few |

Again, practice of the current invention results in stable dispersions of filter dyes that are much improved with respect to needle growth.

The invention has been described in detail with particular reference to preferred embodiments thereof, but it is to be understood that variations and modifications can be effected within the spirit and scope of the invention.

Example 9

A dispersion of [D-25] (S-24) was made by placing 2.4 g of compound D-25 in a 4 oz glass jar containing 18.02 g distilled water, 3.58 g of 6.7% solution of SURF-2, and 60 ml of 1.8 mm zirconium oxide beads. The jar was placed on a Sweco vibratory mill for 7 days. Another dispersion of D-25 (S-25) was made similarly, except with 3.58 g of 6.7% solution of SURF-2, 1.92 g of a 10% solution of P-3, and 16.10 g of water. After milling, the particle size of the dispersions were measured by near infrared turbidimetry. The results are tabulated in Table VIII:

TABLE VIII

| Dispersion | Dispersant | Particle size, microns |
|---|---|---|
| S-24, (comparative) | SURF-2 | 0.179 |
| S-25, (invention) | SURF-2 + PVP | 0.134 |

Again, practice of the current invention results in a stable dispersion of filter dyes that are much smaller in particle size.

What is claimed is:

1. A process for preparing a stable, solid particle dispersion of a substantially water-insoluble compound useful in imaging selected from the group consisting of filter dyes and thermal transfer dyes, comprising the steps of:

(a) forming a coarse aqueous slurry of solid particles of said compound and a hydrophobic, water-soluble polymer in an amount of 0.1 to 100%, by weight based on the weight of said compound; and (b) milling said slurry for time sufficient to provide particles of the desired average particle size;

wherein the polymer is an uncharged or weakly anionically charged water-soluble or water-dispersible homopolymer or copolymer in which at least 10 mole % of the repeat units contain an uncharged pendant group that terminates in (a) a $CH_3$ unit, (b) a ring containing at least two contiguous $CH_2$ units, or (c) an aromatic group.

2. A process in accordance with claim 1, wherein the polymer comprises a vinyl pyrrolidone repeating unit.

3. A process of claim 1, wherein at least one low molecular weight anionic surfactant is added to the slurry.

4. A process of claim 1, where the amount of the hydrophobic, water-soluble or water-dispersible polymer is 0.5 to 20% by weight of the compound useful in imaging.

5. A process of claim 1, which further comprises the step of adding an additional component selected from the group consisting of surfactants, binders and polymers to the dispersion.

6. A process of claim 5, wherein the component is added after the milling step.

7. A process of claim 1, wherein an aqueous dispersion of another photographically useful compound dispersed as a solution in an organic solvent is added to the solid particle dispersion.

8. A process of claim 1 wherein the compound is a filter dye that is uncharged or weakly anionic.

9. A process of claim 1 wherein the compound is a thermal transfer dye that is uncharged or weakly anionic.

10. A product produced by the process of claim 1.

11. A product produced by the process of claim 5.

12. A product produced by the process of claim 7.

13. A photographic element comprising a dispersion produced by the process of claim 1.

14. A photographic element comprising a dispersion produced by the process of claim 5.

15. A photographic element comprising a dispersion produced by the process of claim 7.

* * * * *